(12) United States Patent
Kim

(10) Patent No.: US 7,154,564 B2
(45) Date of Patent: Dec. 26, 2006

(54) METHOD FOR CONTROLLING CHANNEL TUNING OF DIGITAL TV

(75) Inventor: In Hoon Kim, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 873 days.

(21) Appl. No.: 09/908,542

(22) Filed: Jul. 20, 2001

(65) Prior Publication Data

US 2002/0051092 A1 May 2, 2002

(30) Foreign Application Priority Data

Oct. 31, 2000 (KR) .............................. 2000-64333

(51) Int. Cl.
H04N 5/50 (2006.01)

(52) U.S. Cl. ..................................... 348/731

(58) Field of Classification Search ................ 348/731, 348/732, 734, 569, 570, 553–556
See application file for complete search history.

(56) References Cited

U.S. PATENT DOCUMENTS

| 5,200,823 | A | * | 4/1993 | Yoneda et al. .............. 348/473 |
| 5,418,782 | A | * | 5/1995 | Wasilewski ................. 370/486 |
| 5,438,377 | A | * | 8/1995 | Chang ........................ 348/731 |
| 5,465,113 | A | * | 11/1995 | Gilboy ........................ 725/29 |
| 5,594,492 | A | * | 1/1997 | O'Callaghan et al. ...... 725/151 |
| 5,600,378 | A | * | 2/1997 | Wasilewski ................. 348/468 |
| 5,844,595 | A | * | 12/1998 | Blatter et al. ................. 455/83 |
| 6,137,539 | A | * | 10/2000 | Lownes et al. ............. 348/569 |
| 6,249,320 | B1 | * | 6/2001 | Schneidewend et al. .... 348/569 |
| 6,313,886 | B1 | * | 11/2001 | Sugiyama .................... 348/731 |
| 6,369,861 | B1 | * | 4/2002 | Lownes ....................... 348/731 |
| 6,507,951 | B1 | * | 1/2003 | Wugofski ..................... 725/59 |
| 6,600,522 | B1 | * | 7/2003 | Kim ........................... 348/732 |
| 6,621,528 | B1 | * | 9/2003 | Kessler et al. ............. 348/734 |
| 6,661,472 | B1 | * | 12/2003 | Shintani et al. ............. 348/732 |
| 6,775,843 | B1 | * | 8/2004 | McDermott ................. 725/151 |
| 2001/0052124 | A1 | * | 12/2001 | Kim et al. ..................... 725/39 |
| 2003/0133050 | A1 | * | 7/2003 | Shintani et al. ............. 348/734 |

\* cited by examiner

Primary Examiner—Paulos M. Natnael
(74) Attorney, Agent, or Firm—Fleshner & Kim, LLP

(57) ABSTRACT

A method for controlling channel tuning of a digital TV is disclosed, in which a desired channel can easily be tuned in accordance with a user's input in a digital TV having a channel number of a major-minor type. The method for controlling channel tuning of a digital TV includes the steps of tuning a corresponding channel referring to a corresponding channel data depending on whether channel a data of a major number input by a user exists in a previously stored channel map if the user inputs a major number only, controlling an analog channel if the user inputs a major number or a minor number of 0, and controlling tuning of a corresponding channel depending on whether a channel data of the minor number input by the user exists in the previously stored channel map if the user inputs the major number and the minor number not 0. Since the user can recognize the minor channel data of the desired major channel, it is possible to prevent any confusion in selecting a plurality of minor channels from occurring.

16 Claims, 9 Drawing Sheets

METHOD FOR CONTROLLING CHANNEL TUNING OF DIGITAL TV

BACKGROUND OF THE INVENTION

1. Field of the Invention

The present invention relates to a TV, and more particularly, to a method for controlling channel tuning of a digital TV.

2. Background of the Related Art

An analog TV receiver has been commercially used in various types from a small sized TV of 14 inches to a projection TV of 60 inches or greater.

However, the analog TV has several problems in accordance with the trend of a large sized screen and high function. First, when a user views a large sized TV in an analog mode such as NTSC, PAL and SECAM, the user suffers deterioration of picture quality. Second, channels assigned for TV broadcasting are limited to 80 including ultra high frequency channel bands. Actually available ground wave channels are no more than half of the broadcasting channels due to interference between adjacent channels. Third, the analog TV has limitation as a unidirectional medium. In other words, TV has had only a function as a receiving medium but will require a bidirectional function in the future with the spread of personal computer and Internet. Finally, the analog TV has a problem in that its market is completely congested. In other words, since almost every family has two or more analog TVs currently, demand of the analog TV is not expected any longer.

Therefore, to solve the problems of the analog TV market, a digital TV has been developed.

A general digital TV will be described with reference to FIG. 1.

As shown in FIG. 1, the digital TV includes a front end unit 10 for inputting a digital radio frequency (RF) signal and a back end unit 20 for signal processing.

The front end unit 10 includes a tuner/link unit 11 for demodulating the RF signal received through an antenna. The back end unit 20 includes a transport protocol (TP) divider 21, a microprocessor 22, a video/audio decoder 23, an NTSC/PAL encoder 24, an on screen display (OSD)/graphic accelerator 25, a peripheral device processor 26, IEEE1394 27, a traffic controller 28, a DRAM 29 for application software data, and an SRAM 30 for OSD data. The TP divider 21 digitally processes the demodulated RF signal and outputting the digitally processed signal through a monitor and a speaker.

The operation of the aforementioned digital TV will now be described.

A transport packet QPSK modulated by a transmitter is input to the tuner/link 11 thorough the antenna.

The transport packet corresponding to a broadcasting program tuned by a user using a remote controller is divided into audio data, video data, and programmable system information (PSI) by the TP divider 21 under the control of the microprocessor 22 through I$^2$C bus.

The audio data are output to the speaker through the video/audio decoder 23 and an amplifier (not shown) while the video data are output to RGB, Y/C, and CVBS through the video/audio decoder 23 and the NTSC/PAL encoder 24, so that the user can view the video data through a cathode ray tube (CRT) or a flat panel display (FPD).

At the same time, the PSI, i.e., user data, caption data, teletext data, broadcasting guide data, and OSD data, are displayed on a screen, together with the audio signal, through the OSD/graphic accelerator 25.

Meanwhile, the peripheral device processor 26 accesses a remote controller, a GPIO, a smart card, and a modem through an external input terminal so as to interface various broadcasting data and user data.

At this time, the traffic controller 26 controls a flow of a digital signal and a memory access operation of the DRAM 29 and the SRAM 30.

The aforementioned digital TV improves a video quality of the analog TV so as to provide clearer picture quality two times than the analog TV. Since the digital TV has no interference between adjacent channels, channel regions not used conventionally can be used.

According to a program service information protocol (PSIP) which is a broadcasting specific information standard for providing detailed information on a broadcasting program from an advanced television service committee (ATSC) which is a US digital TV standard suggested in November, 1997, a high definition (HD) digital broadcasting program or four standard definition (SD) digital broadcasting programs can be transmitted to a physical channel, i.e., a channel of 6 MHz band. Accordingly, the digital TV has an advantage that can provide various services of several hundred types.

Furthermore, since the digital TV provides bidirectional services to enable Internet service, home shopping service, and home banking service, it is likely to replace an analog channel with a digital channel in the near future. Therefore, it is expected that demand of the digital TV will increase in the future.

The PSIP standard will now be described in more detail. For channel allocation, there are a major channel number and a minor channel number. The major channel number represents a channel number allocated to a band of 6 MHz used for a ground wave broadcasting while the minor channel number represents a channel number allocated to a digital service channel transmitted through a band of 6 MHz.

On the other hand, the ATSC gives each broadcasting station a specific value for the major channel but allows each broadcasting station to manage the minor channel so that the minor channel number can be changed at any time.

The related art digital TV has a problem in that the user cannot tune a corresponding channel if the user does not directly request the minor channel because an easy interface for tuning of the major-minor channel is not provided.

SUMMARY OF THE INVENTION

Accordingly, the present invention is directed to a method for controlling channel tuning of a digital TV that substantially obviates one or more problems due to limitations and disadvantages of the related art.

An object of the present invention is to provide a method for controlling channel tuning of a digital TV in which a desired channel can easily be tuned in accordance with a user's input in a digital TV having a channel number of a major-minor type.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling channel tuning of a digital TV includes the step of tuning a corresponding channel referring to corresponding channel data depending on whether a channel data of a major number input by a user exists in a previously stored channel map if the user inputs a major number.

In another aspect of the present invention, a method for controlling channel tuning of a digital TV includes the step of controlling tuning of an analog channel if a user inputs a major number and a minor number of 0.

In other aspect of the present invention, a method for controlling channel tuning of a digital TV includes the step of controlling tuning of a corresponding channel depending on whether a channel data of a minor number input by a user exists in a previously stored channel map if the user inputs a major number and a minor number not 0.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
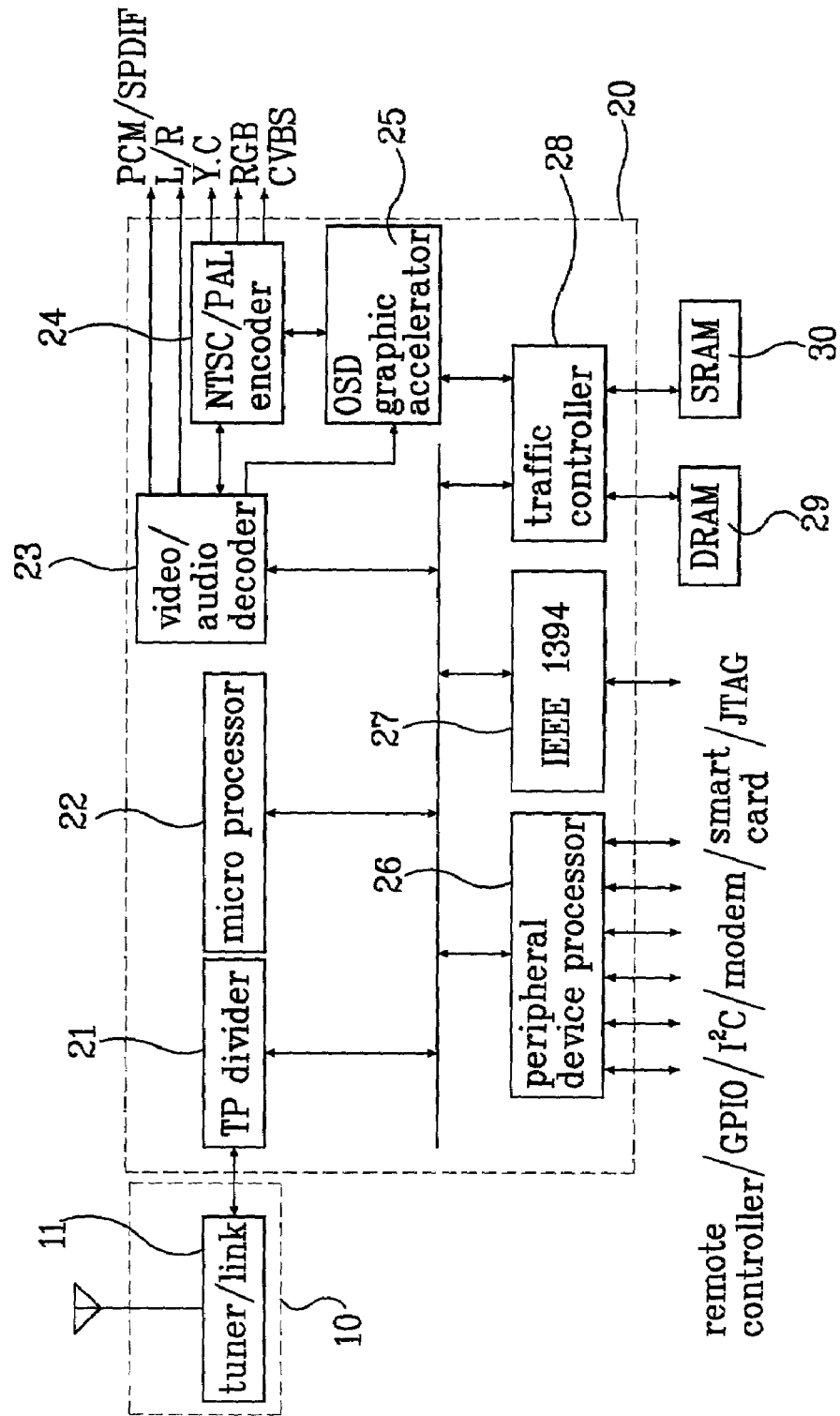
FIG. 1 is a block diagram illustrating a related art digital TV.
Figure 2:
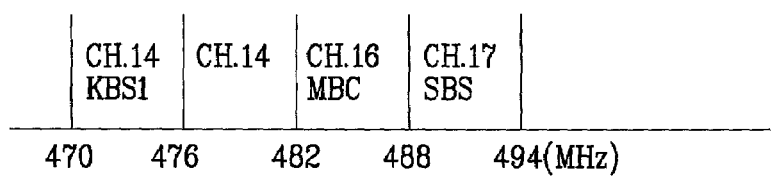
FIG. 2 shows an example of an analog channel allocation.

An analog TV channel is used by allocating an RF channel band designated by a federal communication committee (FCC) as a channel number. As shown in FIG. 2, tuning of an analog channel is implemented in such a manner that an allocated channel number is pressed to search a center frequency of a corresponding band and then a modulated signal is demodulated to be displayed on a screen.

For example, if buttons '1' and '4' of a remote controller are pressed, an RF channel number 14 is tuned so that a broadcasting signal of a corresponding broadcasting station is displayed on the screen.

On the other hand, a digital TV channel consists of a major channel number which is a unique number allocated to each broadcasting station and a minor channel number generated by each broadcasting station when a corresponding broadcasting station broadcasts one or more multi-channels. In other words, one broadcasting channel or various broadcasting channels can be transmitted to the RF channel at the same time. In case where a broadcasting station has one or more channels, the broadcasting station multiplexes two broadcasting screens and transmits the multiplexed result to one RF channel not two RF channels.

Figure 3:
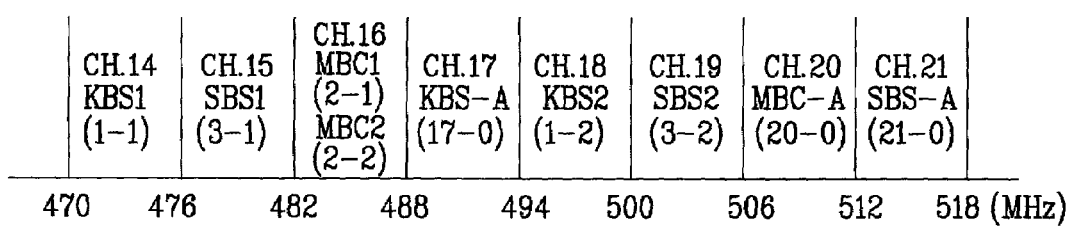
FIG. 3 shows an example of a digital channel allocation.

Referring to FIG. 3, a digital TV broadcasting channel of KBS1 exists in an RF channel number 14 and a digital TV broadcasting channel of KBS2 exists in an RF channel number 18. Digital TV channels of MBC1 and MBC2 exist in an RF channel number 16. A digital channel of SBS is respectively allocated to RF channel numbers 15 and 19. An analog channel is allocated to RF channel numbers 17, 20, and 21.

As described above, the digital TV channel includes a major-minor channel type. The digital TV channel receives not an RF channel number as a major channel number but a unique number of a broadcasting station as a major channel number.

For example, if a broadcasting station KBS has a major number 1, MBC 2, and SBS 3, a digital broadcasting channel of KBS1 transmitted to the RF channel number 14 is 1-1 and a digital broadcasting channel of KBS2 transmitted to the RF channel number 18 is 1-2.

In other words, the related art analog channel can be tuned directly with an allocated RF channel number. However, the digital channel of the major-minor type may not directly tune a desired channel without an exact channel number. Accordingly, the exact channel number should be stored in a channel map by searching whole channels by initial setting after installation of a set.

Figure 4A:
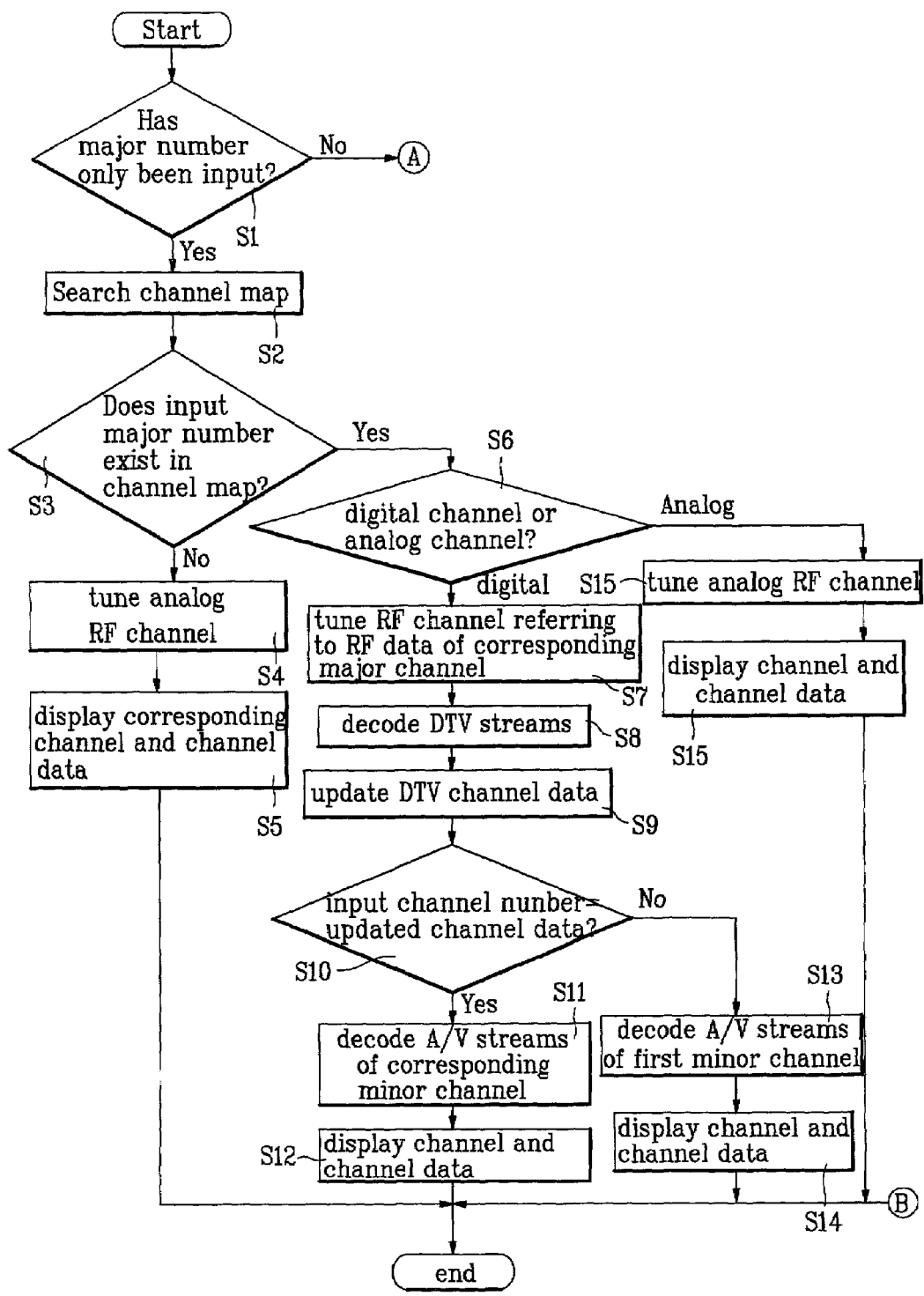
FIG. 4 is a flow chart illustrating a method for controlling channel tuning of a digital TV according to the present invention.
Figure 4B:
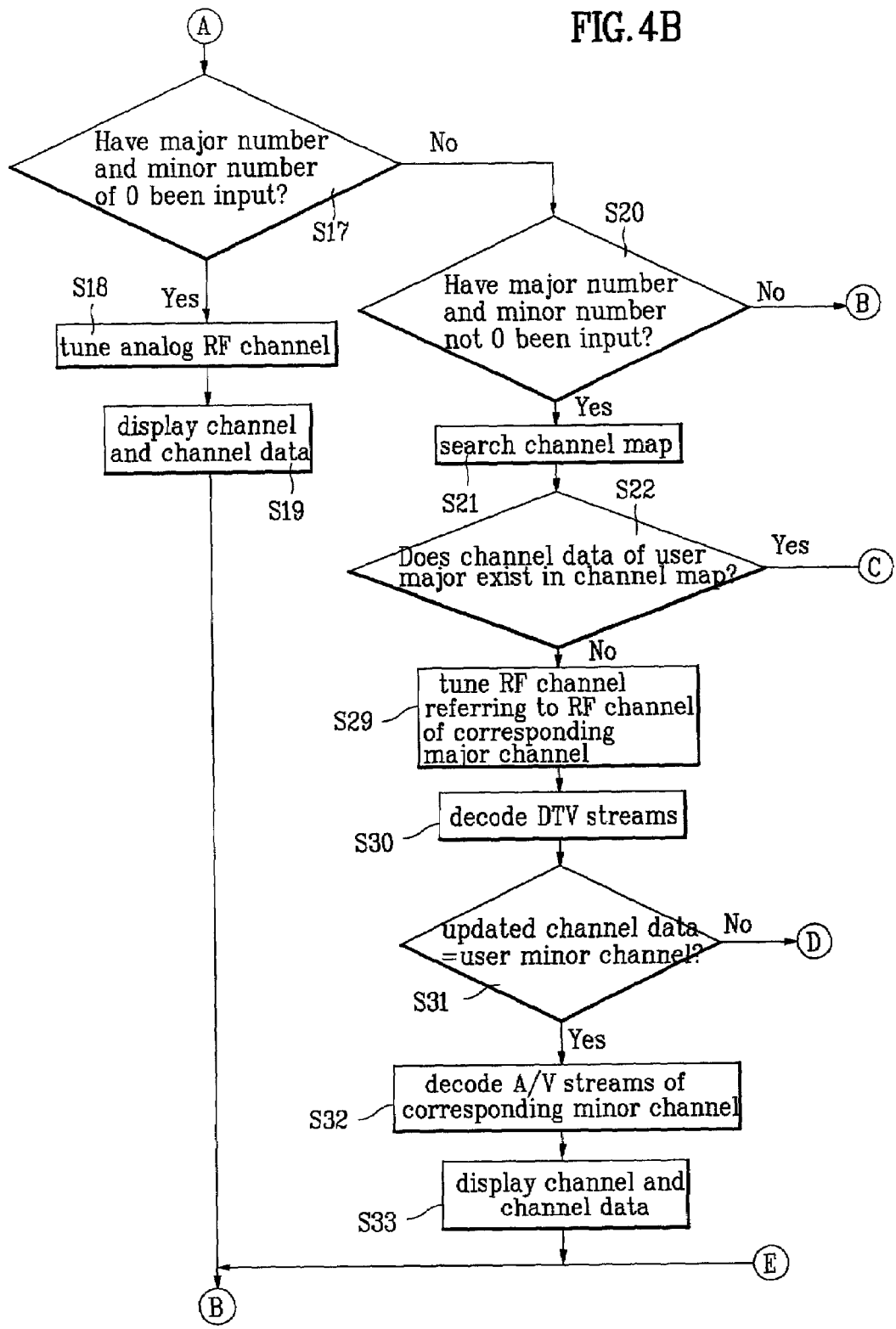
Figure 4C:
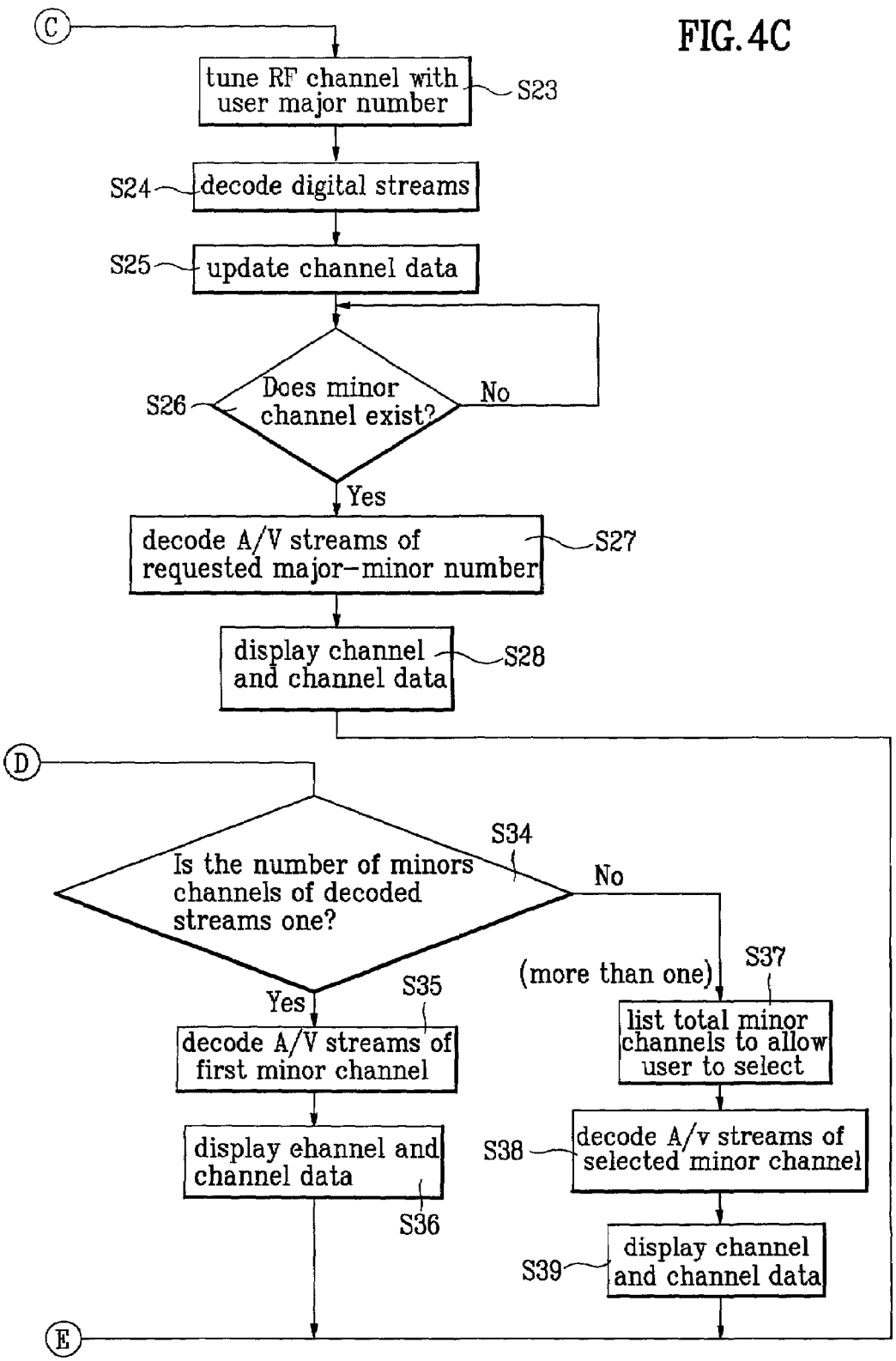

A method for controlling channel tuning of the aforementioned digital TV will now be described with reference to FIG. 4.

First, it is determined whether a user has input a major number only (S1). As a result of the determination (S1), once the user has input the major number only, a previously stored channel map is searched (S2).

It is determined whether a channel data of the major number input by the user exists in the channel map (S3). As a result of the determination (S3), once the channel data of the major number input by the user does not exist in the channel map, an analog RF channel is tuned so that the tuned channel and the channel data are displayed on the screen (S4 and S5).

Meanwhile, as a result of the determination (S3), once the channel data of the major number input by the user exists in the channel map, it is determined whether the channel data is a digital channel or an analog channel (S6). Subsequently, once the channel data is the digital channel, a corresponding RF channel is tuned referring to the RF channel data through the previously stored channel map (S7).

Digital TV streams input through the tuned RF channel are decoded and updated as the decoded channel data (S8 and S9).

It is then determined whether the updated channel data is equal to the channel data input by the user (S10). As a result, once the updated channel data is equal to the channel data input by the user, audio/video streams of a corresponding minor channel are decoded (S11). The decoded channel and the channel data are displayed on the screen (S12).

Meanwhile, as a result of the determination (S10), once the updated channel data is not equal to the channel data input by the user, audio/video streams of a first minor channel are decoded (S13). The decoded channel and the channel data are displayed on the screen (S14).

Furthermore, as a result of the determination (S6), once the channel data is the analog channel, the analog RF channel is tuned so that a corresponding channel and channel data are displayed on the screen (S15 and S16).

Meanwhile, as a result of the determination (S1), once the user has not input the major number, it is determined whether the user has input major-0 (S17).

As a result of the determination (S17), once the user has input major-0, the analog RF channel is tuned so that the tuned channel and the channel data are displayed on the screen (S18 and S19).

Also, as a result of the determination (S17), once the user has not input major-0, it is determined whether the user has input a minor number not major-0 (S20).

Subsequently, as a result of the determination (S20), once the user has input a minor number not major-0, the previously stored channel map is searched (S21).

It is determined whether the channel data of the major number input by the user exists in the previously stored channel map (S22).

Subsequently, as a result of the determination (S22), once the channel data of the major number input by the user exists in the previously stored channel map, the RF channel is tuned with the major number input by the user (S23). Digital streams input through the tuned channel are decoded and the channel data is updated (S24 and S25).

It is determined whether the minor channel exists in the updated channel data (S26). As a result, once the minor channel exists in the updated channel data, audio/video streams of a major-minor number requested by the user are decoded (S27). The decoded channel and the channel data are then displayed on the screen (S28).

Meanwhile, as a result of the determination (S22), once the channel data of the major number input by the user does not exist in the previously stored channel map, the RF channel is tuned referring to the RF channel data of a corresponding major channel (S29). The digital TV streams input through the tuned RF channel are then decoded (S30).

Subsequently, the decoded channel data is updated, and it is determined whether the updated channel data is equal to the minor channel of the user (S31).

As a result of the determination (S31), once the updated channel data is equal to the minor channel, audio/video streams of a corresponding minor channel are decoded so that the decoded channel and the channel data are displayed on the screen (S32 and S33).

Meanwhile, as a result of the determination (S31), once the updated channel data is not equal to the minor channel, it is determined whether the number of the minor channels of the decoded streams is one (S34). As a result, once the number of the minor channels of the decoded streams is one, audio/video streams of the first minor channel are decoded (S35). The decoded channel and the channel data are displayed on the screen (S36).

Meanwhile, as a result of the determination (S34), once the number of the minor channels of the decoded streams is more than one, a list of total minor channels is displayed on the screen in an OSD type and a desired channel of the user is searched referring to the list (S37).

Then, audio/video streams of the minor channel selected by the user are decoded, and the decoded channel and the channel data are displayed on the screen (S38 and S39).

As described above, the method for controlling channel tuning of the digital TV according to the present invention includes a first embodiment that requires tuning by inputting a major number, a second embodiment that requires tuning by inputting a major number and a minor number of 0, and a third embodiment that requires tuning by inputting a major number and a minor number not 0.

First Embodiment

The first embodiment that requires tuning by inputting a major number only will be described with reference to FIGS. 5A to 5C.

Figure 5A:
FIGS. 5A to 5C show a first embodiment of a method for controlling channel tuning of a digital TV according to the present invention.

In case where a major number has been only input in a current channel, a video like FIG. 5A is displayed on the screen.

At this time, a channel map which stores an input major number as a channel data is searched. Once the channel map includes a digital channel data, the RF channel data of a digital channel is read and tuned and digital streams input through a corresponding RF channel are decoded. Then, the channel data is again updated because the number of digital channels within a corresponding major channel and a minor number may differ from a previous tuning time period after the digital streams are decoded.

Figure 5B:

In case where an analog channel exists in a major channel requested by the user in the channel map, or no analog/digital channel exists in the channel map, the analog channel is tuned so that a video like FIG. 5B is displayed on the screen.

Figure 5C:

Furthermore, audio/video streams of a first minor channel of a corresponding major channel are decoded referring to the decoded channel data, so that a video like FIG. 5C is displayed on the screen. Further, a currently tuning major-minor channel is displayed on the screen so as to allow the user to recognize that the first channel of the major channel selected by the user is being tuned.

Second Embodiment

Figure 6A:
FIGS. 6A and 6B show a second embodiment of a method for controlling channel tuning of a digital TV according to the present invention.
Figure 6B:

In case where tuning is requested by inputting a major number and a minor number of 0, an analog channel should directly be tuned. Accordingly, an RF channel equal to the major number is tuned so that videos like FIGS. 6A to 6B are displayed on a screen.

Second Embodiment

Figure 7A:
FIGS. 7A to 7D show a third embodiment of a method for controlling channel tuning of a digital TV according to the present invention.

In case where tuning is requested by inputting a major number and a minor number not 0, a digital channel should directly be tuned. Accordingly, a video like FIG. 7A is displayed on a screen. Then, it is determined whether a digital channel data of a requested major channel exists in a channel map.

Meanwhile, once a minor number requested by a user does not exist in an updated channel data, the minor number will be displayed on the screen through the following procedure.

Once the digital channel data of the major channel exists, a corresponding RF channel is tuned referring to a stored channel data and then input digital streams are decoded to update a decoded channel data. Once the minor channel number input by the user exists, audio/video streams of a major-minor number requested by the user are decoded so that the decoded streams are displayed on the screen.

Figure 7B:
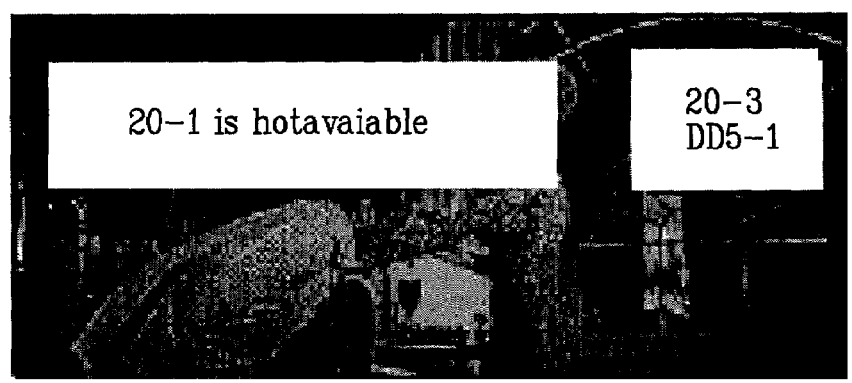

As a result of decoding the audio/video streams of the major-minor number requested by the user, once one minor channel of the decoded RF channel exists, the audio/video streams of the decoded major-minor channel are decoded so that the decoded streams are displayed on the screen. After the major-minor channel number of the decoded audio/video streams is displayed, a video like FIG. 7B is displayed to recognize that the major-minor number requested by the user does not currently exist.

Figure 7C:
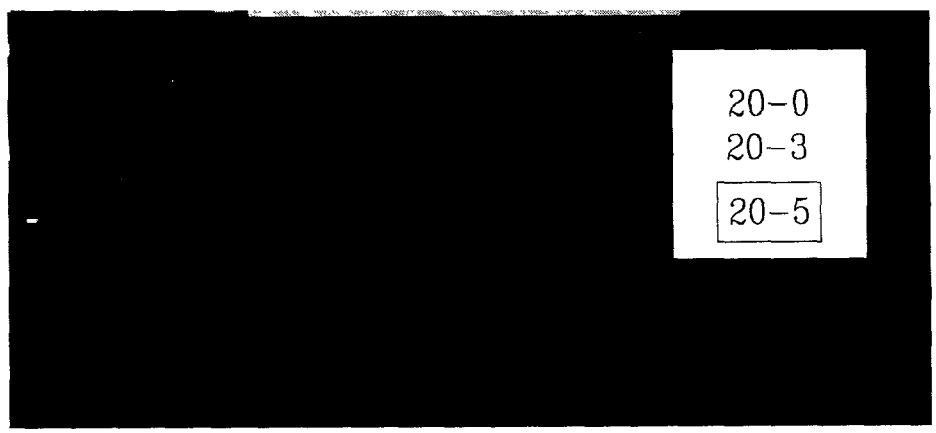
Figure 7D:

Furthermore, if digital streams of a corresponding RF channel consist of various channels but no minor channel requested by the user exists, a list of total minor channels of a decoded major channel is displayed as shown in FIG. 7C in an OSD type. In this case, the user selects a desired channel referring to the list. Audio/video streams of the selected minor channel are decoded so that they are displayed on the screen.

If the major-minor channel requested by the user does not exist in the channel map, an RF channel number equal to the major number is tuned, and the digital streams are decoded. As a result, if the minor number requested by the user exists, audio/video streams of a corresponding major-minor channel are decoded so that the decoded streams are displayed on the screen.

Meanwhile, if no minor number exists, one channel exists within the decoded streams. Accordingly, the channel within the decoded streams is decoded and then displayed on the screen to notify that no minor channel exists. If multi channels exist within the decoded streams, a list of total minor channels is displayed on the screen in an OSD type so that the user selects a desired channel.

As aforementioned, the method for controlling channel tuning of a digital TV according to the present invention has the following advantage.

Since the user can recognize the minor channel data of the desired major channel, it is possible to prevent any confusion in selecting a plurality of minor channels from occurring.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for controlling channel tuning of a digital TV comprising:
    making a decision to search a previously stored channel map based on whether a user inputs a major number without inputting a minor number or whether a user inputs a major number and a minor number;
    determining whether the major number is a digital channel data or an analog channel data if the major number input by the user exists in the searched channel map;
    tuning an RF channel referring to a channel data of a corresponding major channel in the channel map if the major number is a digital channel data;
    decoding digital streams input through the tuned RE channel and updating the channel data; and
    decoding audio/video streams of a corresponding minor channel to be displayed on a screen if the channel data input by the user is equal to the updated channel data.

2. The method of claim 1, further comprising displaying tuning of a first channel of the major channel selected by the user on the screen if the channel data input by the user is not equal to the updated channel data.

3. The method of claim 1, further comprising tuning an analog RF channel and displaying the tuned analog RF channel on the screen if the major number data input by the user does not exist in the searched channel map.

4. The method of claim 1, further comprising tuning an analog RE channel and displaying the tuned channel and channel data on the screen if the major number data input by the user exists in the searched channel map and is an analog channel.

5. A method for controlling channel tuning of a digital TV comprising:
    determining whether a major number input by the user exists in the previously stored channel map if the user inputs the major number and a minor number not 0;
    tuning an RE channel referring to an RE channel data of a corresponding major channel if the major number input by the user exists in the previously stored channel map;
    decoding digital TV streams input through the tuned RE channel and updating the previously stored channel map; and
    decoding audio/video streams corresponding to a major-minor channel input by the user if the minor channel number exists in the updated channel map and displaying the decoded audio/video streams on the screen.

6. The method of claim 5, further comprising:
    tuning the RE channel referring to the RE channel data of the corresponding major channel if the input channel data does not exist in the previously stored channel map;
    decoding the digital TV streams input through the tuned RE channel;
    decoding the decoded channel data;
    decoding audio/video streams of the major-minor number requested by the user if the minor channel number input by the user exists in the decoded channel data; and
    displaying the decoded streams on the screen.

7. The method of claim 5, further comprising tuning channels depending on the number of minor channels of the decoded streams if the channel data input by the user does not exist in the updated channel data or the minor channel data input by the user does not exist in the decoded channel data.

8. The method of claim 7, further comprising:
    decoding audio/video streams of a minor channel if the number of minor channels of the decoded streams is one; and
    displaying the decoded channel on the screen and notifying the user that the channel requested by the user does not exist.

9. The method of claim 8, further comprising:
    displaying a list of total minor channels if the number of minor channels of the decoded streams is more than one;
    selecting a desired channel of the user referring to the displayed list of the total minor channels;
    decoding audio/video streams of the minor channel selected by the user; and
    displaying the decoded channel and the channel data on the screen.

10. The method of claim 9, wherein the list of the total minor channels is displayed on the screen in an OSD type.

11. A method for controlling channel tuning of a digital TV comprising:
    tuning a corresponding channel referring to a corresponding channel data depending on whether channel data of a major number input by a user exists in a previously stored channel map if the user inputs a major number only;
    tuning an analog channel if the user inputs a major number or a minor number of 0; and
    tuning of a corresponding channel depending on whether a channel data of the minor number input by the user exists in the previously stored channel map if the user inputs the major number and the minor number not 0.

12. The method of claim 11, wherein tuning by inputting the major number and the minor number of 0 is to directly tune an analog channel.

13. The method of claim 11, wherein tuning by the major number and the minor number not 0 is to directly tune a digital channel.

14. A method for controlling channel tuning of a digital TV comprising:
- determining whether a channel data of a minor number input by a user exists in a previously stored channel map;
- detecting minor channel data from received TV streams, if the channel data of the minor number does not exist in the previously stored channel map;
- displaying a list of minor channels based on the detected minor channel data; and
- selecting the user's desired minor channel referring to the displayed list of the minor channels.

15. The method of claim 14, further comprising updating the previously stored channel map to add data related to the selected minor channel.

16. The method of claim 14, wherein the list of the minor channels is displayed on the screen in an OSD type.

* * * * *

(12) EX PARTE REEXAMINATION CERTIFICATE (8884th)
United States Patent
Kim

(10) Number: US 7,154,564 C1
(45) Certificate Issued: Mar. 6, 2012

(54) METHOD FOR CONTROLLING CHANNEL TUNING OF DIGITAL TV

(75) Inventor: In Hoon Kim, Kyongsangbuk-do (KR)

(73) Assignee: LG Electronics Inc., Yoida-Dong, Youngdungpo-Gu, Seoul (KR)

Reexamination Request:
No. 90/009,642, Nov. 27, 2009

Reexamination Certificate for:
Patent No.: 7,154,564
Issued: Dec. 26, 2006
Appl. No.: 09/908,542
Filed: Jul. 20, 2001

(30) Foreign Application Priority Data

Oct. 31, 2000 (KR) .......................... 2000-64333

(51) Int. Cl.
*H04N 5/50* (2006.01)

(52) U.S. Cl. ....................................................... 348/731
(58) Field of Classification Search ........................ None
See application file for complete search history.

(56) References Cited

To view the complete listing of prior art documents cited during the proceeding for Reexamination Control Number 90/009,642, please refer to the USPTO's public Patent Application Information Retrieval (PAIR) system under the Display References tab.

*Primary Examiner* — Adam Basehoar

(57) ABSTRACT

A method for controlling channel tuning of a digital TV is disclosed, in which a desired channel can easily be tuned in accordance with a user's input in a digital TV having a channel number of a major-minor type. The method for controlling channel tuning of a digital TV includes the steps of tuning a corresponding channel referring to a corresponding channel data depending on whether channel a data of a major number input by a user exists in a previously stored channel map if the user inputs a major number only, controlling an analog channel if the user inputs a major number or a minor number of 0, and controlling tuning of a corresponding channel depending on whether a channel data of the minor number input by the user exists in the previously stored channel map if the user inputs the major number and the minor number not 0. Since the user can recognize the minor channel data of the desired major channel, it is possible to prevent any confusion in selecting a purality of minor channels from occurring.

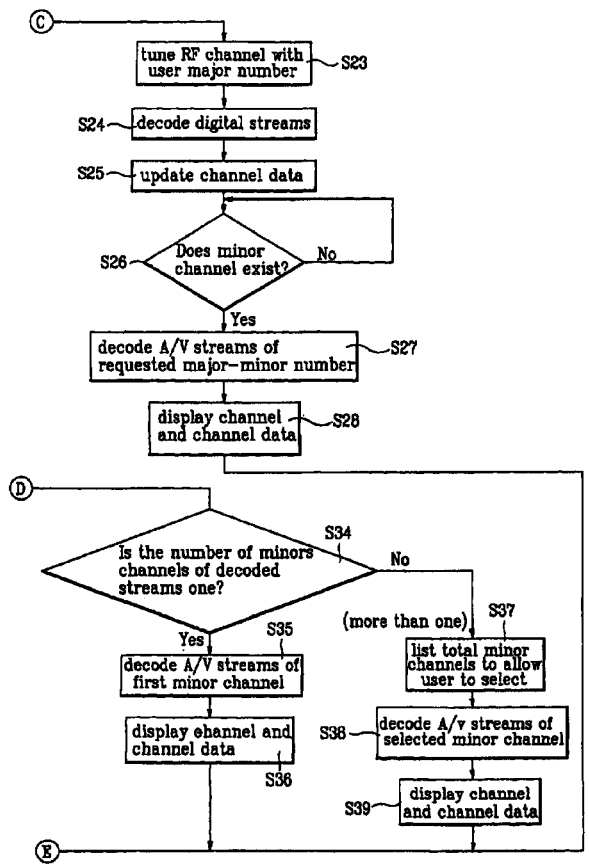

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 11 is determined to be patentable as amended.

Claims 12 and 13, dependent on an amended claim, are determined to be patentable.

New claims 17-64 are added and determined to be patentable.

Claims 1-10 and 14-16 were not reexamined.

11. A method for controlling channel tuning of a digital TV comprising:
 tuning a corresponding channel referring to a corresponding channel data depending on whether channel data of a major number input by a user exists in a previously stored channel map if the user inputs a major number only;
 tuning an analog channel if the user inputs a major number or a minor number of 0; and
 tuning of a corresponding channel depending on whether a channel data of the minor number input by the user exists in the previously stored channel map if the user inputs the major number and the minor number not 0,
 *wherein tuning a corresponding channel referring to a corresponding channel data depending on whether channel data of a major number input by a user exists in a previously stored channel map if the user inputs a major number only comprises:*
  *receiving user input of a major number only;*
  *searching the previously stored channel map using the major number;*
  *determining whether the major number exists in the previously stored channel map based on the searching of the previously stored channel map using the major number; and*
  *in response to a determination that the major number exists in the previously stored channel map, tuning a channel identified by channel data stored in the previously stored channel map in a manner that corresponds to the major number.*

*17. A method for controlling channel tuning of a digital TV comprising:*
 *tuning a corresponding channel referring to a corresponding channel data depending on whether channel data of a major number input by a user exists in a previously stored channel map if the user inputs a major number only;*
 *tuning an analog channel if the user inputs a major number or a minor number of 0;*
 *tuning of a corresponding channel depending on whether a channel data of the minor number input by the user exists in the previously stored channel map if the user inputs the major number and the minor number not 0;*
 *decoding audio and video streams of a major channel;*
 *determining whether the decoded audio and video streams of the major channel include a single minor channel or multiple minor channels;*
 *in response to a determination that the decoded audio and video streams of the major channel include the single minor channel, decoding audio and video streams of the single minor channel and causing display of the decoded audio and video streams of the single minor channel;*
 *in response to a determination that the decoded audio and video streams of the major channel include multiple minor channels:*
  *causing display of a list of the multiple minor channels;*
  *receiving, based on user input and from the displayed list of the multiple minor channels, selection of a desired minor channel;*
  *decoding audio and video streams of the desired minor channel; and*
  *causing display of the desired minor channel using the decoded audio and video streams of the desired minor channel.*

*18. A method for controlling channel tuning of a digital TV comprising:*
 *tuning a corresponding channel referring to a corresponding channel data depending on whether channel data of a major number input by a user exists in a previously stored channel map if the user inputs a major number only;*
 *tuning an analog channel if the user inputs a major number or a minor number of 0;*
 *tuning of a corresponding channel depending on whether a channel data of the minor number input by the user exists in the previously stored channel map if the user inputs the major number and the minor number not 0;*
 *receiving user input of at least a major number;*
 *in response to the user input of at least the major number, identifying multiple minor channels that exist for the major number;*
 *based on identifying the multiple minor channels that exist for the major number, causing display of a list of the multiple minor channels that exist for the major number;*
 *receiving, based on user input and from the displayed list of the multiple minor channels, selection of a desired minor channel;*
 *based on the selection of the desired minor channel, decoding audio and video streams of the desired minor channel; and*
 *causing display of the desired minor channel using the decoded audio and video streams of the desired minor channel.*

*19. A method for controlling channel tuning of a digital TV comprising:*
 *tuning a corresponding channel referring to a corresponding channel data depending on whether channel data of a major number input by a user exists in a previously stored channel map if the user inputs a major number only;*
 *tuning an analog channel if the user inputs a major number or a minor number of 0;*
 *tuning of a corresponding channel depending on whether a channel data of the minor number input by the user* exists in the previously stored channel map if the user inputs the major number and the minor number not 0;

receiving user input of at least a major number;

in response to the user input of at least the major number, identifying multiple minor channels that exist for the major number, the multiple minor channels including an analog channel designated by the major number and a minor number of 0 and a digital channel designated by the major number and a minor number other than 0;

based on identifying the multiple minor channels that exist for the major number, causing display of a list of the multiple minor channels that exist for the major number, the displayed list of the multiple minor channels that exist for the major number including a representation of the analog channel designated by the major number and the minor number of 0 and a representation of the digital channel designated by the major number and the minor number other than 0;

receiving, based on user input and from the displayed list of the multiple minor channels, selection of a desired channel;

based on the selection of the desired channel, causing display of the desired channel.

20. A method for controlling channel tuning of a digital TV comprising:

tuning a corresponding channel referring to a corresponding channel data depending on whether channel data of a major number input by a user exists in a previously stored channel map if the user inputs a major number only;

tuning an analog channel if the user inputs a major number or a minor number of 0;

tuning of a corresponding channel depending on whether a channel data of the minor number input by the user exists in the previously stored channel map if the user inputs the major number and the minor number not 0;

decoding audio and video streams of a major channel;

determining whether the decoded audio and video streams of the major channel include a single minor channel or multiple minor channels;

in response to a determination that the decoded audio and video streams of the major channel include the single minor channel, decoding audio and video streams of the single minor channel and causing display of the decoded audio and video streams of the single minor channel;

in response to a determination that the decoded audio and video streams of the major channel include multiple minor channels:
receiving selection of a desired minor channel;
decoding audio and video streams of the desired minor channel; and
causing display of the desired minor channel using the decoded audio and video streams of the desired minor channel.

21. A method for controlling channel tuning of a digital TV comprising:

tuning a corresponding channel referring to a corresponding channel data depending on whether channel data of a major number input by a user exists in a previously stored channel map if the user inputs a major number only;

tuning an analog channel if the user inputs a major number or a minor number of 0;

tuning of a corresponding channel depending on whether a channel data of the minor number input by the user exists in the previously stored channel map if the user inputs the major number and the minor number not 0;

receiving user input of at least a major number;

in response to the user input of at least the major number, identifying multiple minor channels that exist for the major number;

based on identifying the multiple minor channels that exist for the major number, receiving selection of a desired minor channel;

based on the selection of the desired minor channel, decoding audio and video streams of the desired minor channel; and causing display of the desired minor channel using the decoded audio and video streams of the desired minor channel.

22. A method for controlling channel tuning of a digital TV comprising:

tuning a corresponding channel referring to a corresponding channel data depending on whether channel data of a major number input by a user exists in a previously stored channel map if the user inputs a major number only;

tuning an analog channel if the user inputs a major number or a minor number of 0;

tuning of a corresponding channel depending on whether a channel data of the minor number input by the user exists in the previously stored channel map if the user inputs the major number and the minor number not 0;

receiving user input of at least a major number;

in response to the user input of at least the major number, identifying multiple minor channels that exist for the major number, the multiple minor channels including an analog channel designated by the major number and a minor number of 0 and a digital channel designated by the major number and a minor number other than 0;

based on identifying the multiple minor channels that exist for the major number, receiving selection of a desired channel;

based on the selection of the desired channel, causing display of the desired channel.

23. A method for controlling channel tuning of a digital TV comprising:

tuning a corresponding channel referring to a corresponding channel data depending on whether channel data of a major number input by a user exists in a previously stored channel map if the user inputs a major number only;

tuning an analog channel if the user inputs a major number or a minor number of 0;

tuning of a corresponding channel depending on whether a channel data of the minor number input by the user exists in the previously stored channel map if the user inputs the major number and the minor number not 0;

receiving user input of a major-minor number pair including a major number and a minor number not 0;

tuning a digital RF channel corresponding to the major number included in the major-minor number pair;

decoding digital streams input through the digital RF channel based on tuning the digital RF channel corresponding to the major number included in the major-minor number pair;

determining whether the minor number included in the major-minor number pair is included in the decoded digital streams input through the digital RF channel; and in response to a determination that the minor number included in the major-minor number pair is not included in the decoded digital streams input through the digital RF channel, decoding audio and video streams of a first minor channel included in the decoded digital streams input through the digital RF channel and causing display of the first minor channel using the decoded audio and video streams of the first minor channel, the first minor channel being different than the minor number included in the major-minor number pair.

24. The method of claim 23, further comprising, causing display, concurrently with the display of the first minor channel, of an indication of a channel number for the first minor channel.

25. The method of claim 24, further comprising, causing display, concurrently with the display of the first minor channel and the indication of the channel number for the first minor channel, of an indication that the minor number included in the major-minor number pair is not available.

26. The method of claim 23, further comprising, causing display, concurrently with the display of the first minor channel, of an indication that the minor number included in the major-minor number pair is not available.

27. The method of claim 11, wherein tuning a channel identified by channel data stored in the previously stored channel map in a manner that corresponds to the major number comprises tuning a digital channel that includes the major number and a minor number other than 0 based on the user input of the major number only.

28. The method of claim 27, wherein tuning a digital channel that includes the major number and a minor number other than 0 based on the user input of the major number only comprises decoding audio and video streams of a first minor number corresponding to the major number.

29. The method of claim 27, further comprising causing display of the major number and the minor number other than 0 to indicate that the minor number other than 0 of the major number selected is being tuned based on the user input of the major number only.

30. The method of claim 11, wherein tuning a channel identified by channel data stored in the previously stored channel map in a manner that corresponds to the major number comprises:
determining whether the major number is associated, in the previously stored channel map, with an analog channel or a digital channel;
enabling tuning to a channel in response to a determination that the major number is associated, in the previously stored channel map, with an analog channel and a determination that the major number is associated, in the previously stored channel map, with a digital channel;
in response to a determination that the major number is associated, in the previously stored channel map, with an analog channel, tuning an analog channel; and
in response to a determination that the major number is associated, in the previously stored channel map, with a digital channel, tuning a digital channel.

31. The method of claim 30, wherein tuning the digital channel comprises tuning a digital channel that includes the major number and a minor number other than 0 based on the user input of the major number only.

32. The method of claim 31, wherein tuning a digital channel that includes the major number and a minor number other than 0 based on the user input of the major number only comprises decoding audio and video streams of a first minor number corresponding to the major number.

33. The method of claim 32, further comprising causing display of the major number and the first minor number to indicate that the first minor number of the major number selected is being tuned based on the user input of the major number only.

34. The method of claim 27, wherein tuning a digital channel that includes the major number and a minor number other than 0 based on the user input of the major number only comprises:
tuning a digital RF channel based on the channel data stored in the previously stored channel map in a manner that corresponds to the major number;
decoding digital streams input through the digital RF channel;
identifying a first minor channel included in the decoded digital streams input through the digital RF channel; and
decoding audio and video streams of the identified first minor channel included in the decoded digital streams input through the digital RF channel.

35. The method of claim 11, further comprising, in response to a determination that the major number does not exist in the previously stored channel map, tuning an analog RF channel based on the major number.

36. A method for controlling channel tuning of a digital TV comprising:
tuning a corresponding channel referring to a corresponding channel data depending on whether channel data of a major number input by a user exists in a previously stored channel map if the user inputs a major number only;
tuning an analog channel if the user inputs a major number or a minor number of 0; and
tuning of a corresponding channel depending on whether a channel data of the minor number input by the user exists in the previously stored channel map if the user inputs the major number and the minor number not 0,
wherein tuning a corresponding channel referring to a corresponding channel data depending on whether channel data of a major number input by a user exists in a previously stored channel map if the user inputs a major number only comprises:
receiving, from a user, channel data related to tuning a channel of a digital television;
determining whether the received channel data related to tuning a channel of the digital television includes the major number only;
in response to a determination that the received channel data includes the major number only, searching the previously stored channel map for the major number;
based on the searching of the previously stored channel map for the major number, determining whether the major number exists in the previously stored channel map; and
in response to a determination that the major number does not exist in the previously stored channel map, tuning an analog RF channel based on the major number.

37. A method for controlling channel tuning of a digital TV comprising:
tuning a corresponding channel referring to a corresponding channel data depending on whether channel data of a major number input by a user exists in a previously stored channel map if the user inputs a major number only;

tuning an analog channel if the user inputs a major number or a minor number of 0; and tuning of a corresponding channel depending on whether a channel data of the minor number input by the user exists in the previously stored channel map if the user inputs the major number and the minor number not 0, wherein tuning of a corresponding channel depending on whether a channel data of the minor number input by the user exists in the previously stored channel map if the user inputs the major number and the minor number not 0 comprises:

receiving user input of a major-minor number pair including a major number and a minor number not 0;

searching the previously stored channel map using the major-minor number pair;

determining whether the major-minor number pair exists in the previously stored channel map based on the searching of the previously stored channel map using the major-minor number pair; and in response to a determination that the major-minor number pair exists in the previously stored channel map, tuning a channel identified by channel data stored in the previously stored channel map in a manner that corresponds to the major-minor number pair.

38. The method of claim 37, further comprising, in response to a determination that the major-minor number pair does not exist in the previously stored channel map:

causing display of a list of multiple minor channels that exist for the major number;

receiving, based on user input and from the displayed list of the multiple minor channels, selection of a desired minor channel;

based on the selection of the desired minor channel, decoding audio and video streams of the desired minor channel; and causing display of the desired minor channel using the decoded audio and video streams of the desired minor channel.

39. The method of claim 37, further comprising, in response to a determination that the major-minor number pair does not exist in the previously stored channel map:

determining that a single minor channel exists for the major number;

based on the determination that the single minor channel exists for the major number, decoding audio and video streams of the single minor channel; and causing display of the single minor channel using the decoded audio and video streams of the single minor channel.

40. The method of claim 39, wherein decoding audio and video streams of the single minor channel and causing display of the single minor channel using the decoded audio and video streams of the single minor channel occur without soliciting additional user input after receiving the user input of the major-minor number pair.

41. The method of claim 39, further comprising causing display, concurrently with the display of the single minor channel, of an indication that the major-minor number pair received in the user input is not available.

42. The method of claim 37, further comprising, in response to a determination that the major-minor number pair does not exist in the previously stored channel map, causing display of an indication that the major-minor number pair received in the user input is not available.

43. A method for controlling channel tuning of a digital TV comprising:

tuning a corresponding channel referring to a corresponding channel data depending on whether channel data of a major number input by a user exists in a previously stored channel map if the user inputs a major number only;

tuning an analog channel if the user inputs a major number or a minor number of 0; and tuning of a corresponding channel depending on whether a channel data of the minor number input by the user exists in the previously stored channel map if the user inputs the major number and the minor number not 0, wherein tuning of a corresponding channel depending on whether a channel data of the minor number input by the user exists in the previously stored channel map if the user inputs the major number and the minor number not 0 comprises:

receiving user input of a major-minor number pair including a major number and a minor number not 0;

searching the previously stored channel map using at least the major number included in the major-minor number pair;

determining whether the major number exists in the previously stored channel map based on the searching of the previously stored channel map using at least the major number included in the major-minor number pair;

in response to a determination that the major number exists in the previously stored channel map, determining whether the minor number included in the major-minor number pair exists for the major number included in the major-minor number pair; and in response to a determination that the minor number included in the major-minor number pair exists for the major number included in the major-minor number pair, decoding audio and video streams of the major-minor number pair received in the user input and causing display of a channel corresponding to the major-minor number pair received in the user input using the decoded audio and video streams of the major-minor number pair received in the user input.

44. The method of claim 43, wherein determining whether the minor number included in the major-minor number pair exists for the major number included in the major-minor number pair comprises:

tuning a digital channel identified by channel data stored in the previously stored channel map in the manner that corresponds to the major number;

decoding digital streams input through the digital channel; and determining whether the minor number included in the major-minor number pair is included in the decoded digital streams input through the digital channel.

45. The method of claim 43, further comprising, in response to a determination that the minor number included in the major-minor number pair does not exist for the major number included in the major-minor number pair;

causing display of a list of multiple minor channels that exist for the major number;

receiving, based on user input and from the displayed list of the multiple minor channels, selection of a desired minor channel;

based on the selection of the desired minor channel, decoding audio and video streams of the desired minor channel; and causing display of the desired minor channel using the decoded audio and video streams of the desired minor channel.

46. The method of claim 43, further comprising, in response to a determination that the minor number included in the major-minor number pair does not exist for the major number included in the major-minor number pair;
determining that a single minor channel exists for the major number;
based on the determination that the single minor channel exists for the major number, decoding audio and video streams of the single minor channel; and
causing display of the single minor channel using the decoded audio and video streams of the single minor channel.

47. The method of claim 46, further comprising causing display, concurrently with the display of the single minor channel, of an indication that the major-minor number pair received in the user input is not available.

48. The method of claim 43, further comprising, in response to a determination that the minor number included in the major-minor number pair does not exist for the major number included in the major-minor number pair, causing display of an indication that the major-minor number pair received in the user input is not available.

49. A method for controlling channel tuning of a digital TV comprising:
tuning a corresponding channel referring to a corresponding channel data depending on whether channel data of a major number input by a user exists in a previously stored channel map if the user inputs a major number only;
tuning an analog channel if the user inputs a major number or a minor number of 0; and
tuning of a corresponding channel depending on whether a channel data of the minor number input by the user exists in the previously stored channel map if the user inputs the major number and the minor number not 0,
wherein tuning of a corresponding channel depending on whether a channel data of the minor number input by the user exists in the previously stored channel map if the user inputs the major number and the minor number not 0 comprises:
tuning a digital RF channel based on channel data stored in the previously stored channel map in a manner that corresponds to the major number;
decoding digital streams input through the digital RF channel;
identifying a first minor channel included in the decoded digital streams input through the digital RF channel; and
decoding audio and video streams of the identified first minor channel included in the decoded digital streams input through the digital RF channel.

50. A method for controlling channel tuning of a digital TV comprising:
tuning a corresponding channel referring to a corresponding channel data depending on whether channel data of a major number input by a user exists in a previously stored channel map if the user inputs a major number only;
tuning an analog channel if the user inputs a major number or a minor number of 0; and
tuning of a corresponding channel depending on whether a channel data of the minor number input by the user exists in the previously stored channel map if the user inputs the major number and the minor number not 0,
wherein tuning a corresponding channel referring to a corresponding channel data depending on whether channel data of a major number input by a user exists in a previously stored channel map if the user inputs a major number only, tuning an analog channel if the user inputs a major number or a minor number of 0, and tuning of a corresponding channel depending on whether a channel data of the minor number input by the user exists in the previously stored channel map if the user inputs the major number and the minor number not 0 comprises:
enabling tuning responsive to receipt of at least the following three input types: (1) a major number only, (2) a major number and a minor number of 0, and (3) a major number and a minor number other than 0, wherein, the method includes:
responsive to receipt of (1) a major number only, searching the previously stored channel map and tuning the corresponding channel referring to the corresponding channel data based on results of searching the previously stored channel map,
responsive to receipt of (2) a major number and a minor number of 0, tuning an analog channel, and
responsive to receipt of (3) a major number and a minor number other than 0, searching the previously stored channel map and tuning the corresponding channel based on results of searching the previously stored channel map.

51. A method for controlling channel tuning of a digital TV comprising:
tuning a corresponding channel referring to a corresponding channel data depending on whether channel data of a major number input by a user exists in a previously stored channel map if the user inputs a major number only;
tuning an analog channel if the user inputs a major number or a minor number of 0;
tuning of a corresponding channel depending on whether a channel data of the minor number input by the user exists in the previously stored channel map if the user inputs the major number and the minor number not 0;
receiving, from a user, channel data related to tuning a channel of a digital television;
determining whether the received channel data related to tuning a channel of the digital television includes a major number only, a major number and a minor number of 0, or a major number and a minor number other than 0;
enabling tuning to a channel in response to a determination that the received channel data related to tuning a channel of the digital television includes the major number only, a determination that the received channel data related to tuning a channel of the digital television includes the major number and the minor number of 0, and a determination that the received channel data related to tuning a channel of the digital television includes the major number and the minor number other than 0;
determining that the received channel data related to tuning a channel of the digital television includes the major number only, and searching the previously stored channel map when determining that the received channel data related to tuning a channel of the digital television includes the major number only; and determining that the received channel data related to tuning a channel of the digital television includes the major number and the minor number other than 0, and searching the previously stored channel map when determining that the received channel data related to tuning a channel of the digital television includes the major number and the minor number other than 0, wherein tuning the corresponding channel referring to the corresponding channel data depending on whether channel data of the major number input by the user exists in the previously stored channel map if the user inputs the major number only comprises tuning the corresponding channel referring to the corresponding channel data based on results of searching the previously stored channel map when determining that the received channel data related to tuning a channel of the digital television includes the major number only, and wherein tuning of the corresponding channel depending on whether the channel data of the minor number input by the user exists in the previously stored channel map if the user inputs the major number and the minor number not 0 comprises tuning the corresponding channel based on results of searching the previously stored channel map when determining that the received channel data related to tuning a channel of the digital telelvision includes the major number and the minor number other than 0.

52. The method of claim 51, wherein tuning an analog channel if the user inputs a major number or a minor number of 0 comprises tuning an analog channel if the user inputs a major number and a minor number of 0.

53. The method of claim 52, wherein tuning an analog channel if the user inputs a major number and a minor number of 0 comprises:
 receiving, from a user, channel data related to tuning a channel of a digital television;
 determining that the received channel data related to tuning a channel of the digital television includes the major number and the minor number of 0; and
 tuning an analog RF channel equal to the major number in response to the determination that the received channel data related to tuning a channel of the digital television includes the major number and the minor number of 0.

54. The method of claim 53, wherein tuning the RF channel equal to the major number comprises tuning, without searching the previously stored channel map, the RF channel equal to the major number in response to the determination that the received channel data related to tuning a channel of the digital television includes the major number and the minor number of 0.

55. A method for controlling channel tuning of a digital TV comprising:
 tuning a corresponding channel referring to a corresponding channel data depending on whether channel data of a major number input by a user exists in a previously stored channel map if the user inputs a major number only;
 tuning an analog channel if the user inputs a major number or a minor number of 0;
 tuning of a corresponding channel depending on whether a channel data of the minor number input by the user exists in the previously stored channel map if the user inputs the major number and the minor number not 0;
 receiving user input of the major number only;
 searching the previously stored channel map in response to receiving the user input of the major number only;
 receiving user input of the major number and the minor number not 0; and
 searching the previously stored channel map in response to receiving the user input of the major number amd the minor number not 0.

56. A method for controlling channel tuning of a digital TV comprising:
 tuning a corresponding channel referring to a corresponding channel data depending on whether channel data of a major number input by a user exists in a previously stored channel map if the user inputs a major number only;
 tuning an analog channel if the user inputs a major number or a minor number of 0;
 tuning of a corresponding channel depending on whether a channel data of the minor number input by the user exists in the previously stored channel map if the user inputs the major number and the minor number not 0;
 receiving, from a user, channel data related to tuning a channel of a digital television;
 determining whether the received channel data related to tuning a channel of the digital television includes a major number without input of a minor number or whether the received user input related to tuning a channel of the digital television includes a major number and a minor number other than 0;
 searching the previously stored channel map based on a determination that the received channel data includes a major number without input of a minor number; and
 searching the previously stored channel map based on a determination that the received channel data includes a major number and a minor number other than 0.

57. The method of claim 11, wherein tuning an analog channel if the user inputs a major number or a minor number of 0 comprises tuning an analog channel if the user inputs a major number and a minor number of 0.

58. The method of claim 11, wherein tuning an analog channel if the user inputs a major number or a minor number of 0 comprises tuning an analog channel if the user inputs only a major number.

59. The method of claim 11, wherein tuning an analog channel if the user inputs a major number or a minor number of 0 comprises tuning an analog channel if the user inputs only 0 as a minor number.

60. The method of claim 11, wherein tuning an analog channel if the user inputs a major number or a minor number of 0 comprises tuning an analog channel if the user provides either of input of a major number that corresponds to an analog channel or input that includes a minor number of only 0.

61. A method for controlling channel tuning of a digital TV comprising:
 receiving first user input of a major number only;
 determining that the first user input includes a major number only;
 in response to determining that the first user input includes a major number only, searching a previously stored channel map based on the first user input;
 determining, based on the searching of the previously stored channel map based on the first user input, whether the major number in the first user input exists in the previously stored channel map;
 when determining that the major number in the first user input exists in the previously stored channel map, tuning a corresponding channel referring to a corresponding channel data stored in the previously stored channel map;

when determining that the major number in the first user input does not exist in the previously stored channel map, tuning an analog channel based on the major number in the first user input;

receiving second user input of a major number and a minor number not 0;

in response to receiving the second user input of the major number and the minor number not 0, searching the previously stored channel map based on the second user input;

determining, based on the searching of the previously stored channel map based on the second user input, whether a channel data of the minor number in the second user input exists in the previously stored channel map;

when determining that the channel data of the minor number in the second user input exists in the previously stored channel map, tuning a corresponding channel based on the channel data of the minor number in the second user input stored in the previously stored channel map;

when determining that the channel data of the minor number in the second user input does not exist in the previously stored channel map, tuning a channel based on the major number in the second user input;

receiving third user input of a major number or a minor number of 0; and in response to receiving the third user input of the major number or the minor number of 0, tuning an analog channel.

62. The method of claim 61:

wherein receiving third user input of a major number or a minor number of 0 comprises receiving third user input of a major number and a minor number of 0; and wherein tuning an analog channel comprises tuning an analog channel in response to receiving the third user input of the major number and the minor number of 0.

63. The method of claim 61:

wherein receiving third user input of a major number or a minor number of 0 comprises receiving third user input that includes a minor number of 0; and wherein tuning an analog channel comprises tuning an analog channel in response to receiving the third user input that includes the minor number of 0.

64. The method of claim 61:

wherein receiving third user input of a major number or a minor number of 0 comprises receiving third user input of only a major number that corresponds to an analog channel; and wherein tuning an analog channel comprises tuning an analog channel in response to receiving the third user input of only the major number that corresponds to an analog channel.

* * * * *